United States Patent [19]
Kelley et al.

[11] Patent Number: 6,153,106
[45] Date of Patent: Nov. 28, 2000

[54] METHOD FOR INHIBITING THE FORMATION AND DEPOSITION OF SILICA SCALE IN WATER SYSTEMS

[75] Inventors: Douglas G. Kelley; Kevin J. Moeggenborg; David P. Workman, all of Naperville, Ill.

[73] Assignee: Nalco Chemical Company, Naperville, Ill.

[21] Appl. No.: 09/261,821

[22] Filed: Mar. 3, 1999

[51] Int. Cl.[7] .................................................. C02F 5/12
[52] U.S. Cl. ..................... 210/698; 252/180; 252/392; 422/16
[58] Field of Search ..................... 210/698–701, 210/702, 732, 749, 750, 764; 252/180, 390, 392; 422/16, 17

[56] References Cited

U.S. PATENT DOCUMENTS

| | | | |
|---|---|---|---|
| 2,926,116 | 2/1960 | Keim | 162/164 |
| 2,926,154 | 2/1960 | Keim | 260/29.2 |
| 3,607,622 | 9/1971 | Espy | 162/167 |
| 3,779,793 | 12/1973 | Hughes et al. | 117/72 |
| 3,793,194 | 2/1974 | Zecher | 210/698 |
| 4,469,615 | 9/1984 | Tsuruoka et al. | 252/180 |
| 4,532,047 | 7/1985 | Dubin | 210/698 |
| 5,247,087 | 9/1993 | Rivers | 544/357 |
| 5,344,674 | 9/1994 | Wu | 427/386 |
| 5,527,863 | 6/1996 | Wood et al. | 525/432 |
| 5,658,464 | 8/1997 | Hann et al. | 210/697 |
| 5,658,465 | 8/1997 | Nicholas et al. | 210/698 |
| 6,005,040 | 12/1999 | Howland et al. | 524/406 |

OTHER PUBLICATIONS

Dubin et al., *Deposit Control in High Silica Water*, Materials Performance. pp. 27–33 (1985).

Gill, *Silica Scale Control*, Corrosion 98, Paper No. 226 (1998).

*Primary Examiner*—Peter A. Hruskoci
*Attorney, Agent, or Firm*—Michael B. Martin; Kelly L. Cummings; Thomas M. Breininger

[57] ABSTRACT

The present invention relates to a method for inhibiting the formation and deposition of silica scale in water systems. The method includes treating the water in such water systems with an effective amount of a polyamide that exhibits secondary amine and/or ether and amide functional groups.

6 Claims, No Drawings

METHOD FOR INHIBITING THE FORMATION AND DEPOSITION OF SILICA SCALE IN WATER SYSTEMS

BACKGROUND OF THE INVENTION

The present invention generally relates to silica scale inhibitors. More specifically, the present invention relates to a method for inhibiting the formation and deposition of silica and silicate compounds in water systems with water-soluble polyamides.

In many parts of the world, amorphous silica scales cause significant fouling problems when industrial waters contain high quantities of silica. For the most part, high quantities of silica means that the industrial waters contain at least 5 ppm and up to about 500 ppm dissolved silica and may contain higher quantities of silica either in dissolved, dispersed or colloidal forms.

The solubility of silica adversely limits the efficient use of water in industrial applications, such as cooling, boiler, geothermal, reverse osmosis and papermaking. Specifically, water treatment operations are limited because the solubility of silica at about 150 ppm can be exceeded when minerals are concentrated during processing. This can result in the precipitation and deposition of amorphous silica and silicates with consequential loss of equipment efficiency. Moreover, the accumulation of silica on internal surfaces of water treatment equipment, such as boilers, cooling, and purification systems, reduces heat transfer and fluid flow through heat exchange tubes and membranes.

Once the silica scale forms on water treatment equipment, the removal of such scale is very difficult and costly. With high silica water, therefore, cooling and reverse osmosis systems typically operate at low water-use efficiency to assure that the solubility of silica is not exceeded. Under these conditions, however, reverse osmosis systems must limit their pure water recovery rate and cooling systems must limit water recycling. In both cases, water discharge volumes are large.

Various additives have been employed over the years to inhibit silica deposition. The current technologies for silica scale control in industrial cooling systems involve the use of either colloidal silica dispersants or silica polymerization inhibitors. Dispersant technologies have shown little activity, being able to stabilize only slight increases of total silica in a tower. For instance, by feeding a dispersant, silica levels may increase from 150–200 to 180–220 ppm, which is often an undetectable increase in silica cycles.

On the other hand, silica polymerization inhibitors have shown to be more effective against silica scale deposition. For example, U.S. Pat. No. 4,532,047 to Dubin relates to the use of a water-soluble low molecular weight polypolar organic compound for inhibiting amorphous silica scale formation on surfaces in contact with industrial waters. Likewise, U.S. Pat. No. 5,658,465 to Nicholas et al relates to the use of polyoxazoline as a silica scale inhibition technology. These polymerization inhibitors have allowed for increases in soluble silica to greater than 300 ppm without scale formation.

SUMMARY OF THE INVENTION

The present invention provides an improved method for inhibiting the formation and deposition of silica and silicate compounds in water systems. The inventors have surprisingly discovered that certain polymers containing secondary amine and/or ether and amide functional groups are effective inhibitors of soluble silica polymerization and scale development in water systems. The inventors believe that the use of a polymer with such secondary functional groups prevents potential stearic hindrance that occurs in prior polymeric formulations.

The present invention specifically relates to the use of a polyamide composition for inhibiting the formation and deposition of silica and silicate compounds in water systems. The water-soluble polyamides of the present invention are formed from condensation polymerization of at least one or more carboxylic acids, esters, or anhydrides with one or more polyamines. In an embodiment, the water-soluble polyamides may also include at least one epoxy resin having at least two epoxide groups. In another embodiment, the condensation polymer formed from the condensing of at least two compounds may further be cross-linked with a cross-linking agent.

In an embodiment, the polyamide is obtained by the polymerization of: 1) at least one carbonyl compound having at least two functional groups of the formula

wherein Z may be —OH; —OR$_1$ wherein R$_1$ may be linear, cyclic or branched alkylene groups having from one to eight carbon atoms, aromatic groups, polycyclic groups or heteroaromatic groups; —Cl; —Br or —F, with 2) at least one polyamine having at least two amine groups.

In an embodiment, the polyamine may be either polyamines of the formula

wherein R$_2$ and R$_3$ may be the same or different and are linear, cyclic or branched alkylene groups containing from 2–8 carbon atoms, aromatic groups, polycyclic groups or heteroaromatic groups; polyamines of the formula:

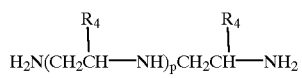

wherein R$_4$ is chosen at each occurrence, from hydrogen, C$_1$–C$_4$ alkyl groups or mixtures thereof; and p is an integer ranging from 0–8; and/or polyamines of the formula:

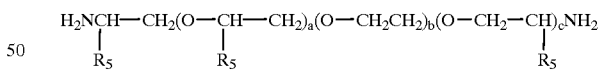

wherein the sum of a+c ranges from about 0 to 8, b ranges from about 2 to about 50 and R$_5$ may be hydrogen, an alkyl group of one to four carbon atoms or combinations thereof.

In another embodiment, the polyamide is obtained by the polymerization of at least three compounds—(1) a carboxylic acid, ester or anhydride, each with at least two carbonyl groups, as set forth herein; (2) a polyamine with at least two amine groups as set forth herein; and (3) an epoxy resin having at least two epoxide groups.

The epoxy resin may be any compound containing two or more epoxide groups. Preferably, the epoxy resin may be selected from the group consisting of: 2,2-bis(4-hydroxyphenyl) propane diglycidyl ether; 2,2'-[(1-methylethylidene)bis(4,1-phenyleneoxymethylene)] bisoxirane hompolymer; resorcinol diglycidyl ether;

hydroquinone diglycidyl ether; triglycidyl tris(2-hydroxyethyl) isocyanurate; glycerol polyglycidyl ether; trimethylolpropane polyglycidyl ether; diglycerol polyglycidyl ether; polyglycerol polyglycidyl ether; sorbitol polyglycidyl ether and pentaerythritol polyglycidyl ether.

Still further, in an embodiment, the condensation polymer of the invention may be further cross-linked with suitable cross-linking agents. The post-polymerization cross-linking agent may be any compound containing two or more reactive functional groups, such as epoxides. For example, the epoxy resins identified above can likewise be used as cross-linking agents. Specifically, useful polyepoxide cross-linkers include, for example: 2,2-bis(4-hydroxyphenyl) propane diglycidyl ether; 2,2'-[(1-methylethylidene)bis(4,1-phenyleneoxymethylene)]bisoxirane hompolymer; resorcinol diglycidyl ether; hydroquinone diglycidyl ether; triglycidyl tris(2-hydroxyethyl) isocyanurate; glycerol polyglycidyl ether; trimethylolpropane polyglycidyl ether; diglycerol polyglycidyl ether; polyglycerol polyglycidyl ether; sorbitol polyglycidyl ether and pentaerythritol polyglycidyl ether.

The condensation polymers of the present invention may be used alone or in combination with other water treating agents. For example, the polymers may be used in combination with phosphoric acids and their salts, phosphonic acids and their salts, metal chelating agents, corrosion inhibitors, polymer scale control dispersants, microbiocides, flocculants, coagulants, oxygen scavengers, neutralizing amines, scale inhibitors, homo- and copolymers of acrylic acid, and homo- and copolymers of maleic acid or anhydride and acrylic acid/maleic acid based polymers.

An advantage of the present invention is it provides a liquid polymeric scale inhibitor that is much easier to handle and feed than the borate silica scale inhibitors.

Another advantage of the present invention is that it provides a condensation polymer that is less expensive to manufacture than the polyoxazoline proposed in U.S. Pat. No. 5,658,465, resulting in increased cost performance. Moreover, the polymer of the present invention is more cost-effective; it has been shown to outperform prior polymeric compositions on an equal polymer actives weight basis.

Moreover, an advantage of the invention is that it minimizes potential stearic problems associated with prior polyamide silica inhibitors by utilizing secondary amine and/or ether and amide functionality. Specifically, the polyaminoamides and polyetheramides of the present invention incorporate both the amine (or ether) and amide functionalities into the backbone of the polymer. Therefore, the ability of these functional groups to interact in solution with silica and silicate species is enhanced. On the other hand, U.S. Pat. No. 5,658,465 teaches the use of polyamides created by polymerizing oxazoline monomers. These polyamides contain only amide functional groups, rather than a combination of amide, amine and/or ether functional groups. In addition, the polyoxazolines taught by Nicholas et al have the amide functional groups pendent to the polymer backbone, which the inventors believe causes the activity of these polymers to suffer due to the pendent amide being trapped between the terminal amide R-group and the polymer backbone, which stearically hinders interactions with the silica and silicate species.

Still further, another unique aspect of the polyamide technology of the present invention is that it incorporates the activity of the amine and/or ether functional groups as well as that of the amide. In this way, there are more functional sites on the polymer for enhancing the interactions with silica and silicate species in solution as compared to previous polyoxazoline technologies.

Additional features and advantages of the present invention are described in, and will be apparent from, the detailed description of the presently preferred embodiments.

DETAILED DESCRIPTION OF PRESENTLY PREFERRED EMBODIMENTS

The present invention provides a method for inhibiting the deposition of silica and silicate compounds in water systems by employing a polyamide polymer which exhibits secondary amine and/or ether and amide functionality. Specifically, the polyamides of the present application are water-soluble condensation polymers formed from the polymerization of at least one carbonyl compound having at least two functional groups of the formula

wherein Z is selected from the group consisting of —OH; —OR$_1$ wherein R$_1$ is selected from the group consisting of linear, cyclic or branched alkylene groups having from one to eight carbon atoms, aromatic groups, polycyclic groups and heteroaromatic groups; —Cl; —Br and —F, with at least one polyamine having at least two amine groups.

The polyamides of the present invention are prepared by condensing one or more carboxylic acids, esters or anhydrides with one or more amines. In an embodiment, the polyamides also include an epoxy resin component. In this embodiment, then, the polyamides are prepared by condensing one or more carboxylic acids, esters or anhydrides with one or more polyamines and an epoxy resin. Preferably, the condensation polymer is prepared by condensing one or more carboxylic acids, esters or anhydrides with one or more polyamines and the reaction product of an epoxy resin with one or more polyamines.

The condensation polymer is made up of dimeric repeating units, such as in the structure:

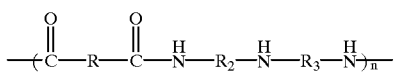

wherein n is an integer providing a weight average molecular weight of at least 500.

A variety of carbonyl compounds may be utilized as one of the monomers in the resulting polyamides of the present invention. One example of a carbonyl compound having the general structure described above is a dicarboxylic acid having the structure:

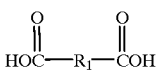

wherein R$_1$ is a linear, cyclic, or branched alkylene group having from 0 to 8 carbon atoms, an aromatic group, a polycyclic group or a heteroaromatic group (as utilized herein, the term carboxylic acid, ester or anhydride are meant to also encompass multifunctional compounds which are carboxylic acids, esters or anhydrides also containing other functional groups or more than two acid, ester or anhydride groups).

In an embodiment, the dicarboxylic acid may have at least four carbon atoms. The dicarboxylic acid may be adipic acid, sebacic acid, terephthalic acid, or said dicarboxylic acids may be mixtures of sebacic acid and adipic acid, or terephthalic acid and adipic acid, among others. The dicarboxylic acid is preferably a diacid containing at least four carbon atoms, and is preferably adipic acid, i.e.

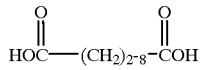

most preferably,

The polyamides of the invention also include amine monomers. Specifically, the polyamides include at least one polyamine having at least two amine groups. For example, the polyamine may be of the formula

wherein $R_2$ and $R_3$ may be the same or different and are linear, cyclic or branched alkylene groups containing from 2–8 carbon atoms, aromatic groups, polycyclic groups or heteroaromatic groups. Polyamines having heteroaromatic groups include aziridines, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'diaminoalkylpiperazines, azepines, azocines, azonines, azecines and tetra-, di- and perhydro derivatives of each of the above and mixtures of two or more of these heterocyclic amines.

The aromatic group can be a single aromatic nucleus, such as a benzene nucleus, a pyridine nucleus, a thiophene nucleus, a 1,2,3,4-tetrahydronaphthalene nucleus, or a polynuclear aromatic moiety. Such polynuclear moieties can be of the fused type, that is wherein at least two aromatic nuclei are fused at two points to another nucleus such as found in naphthalene, anthracene, and the azanaphthalenes among others. Such polynuclear aromatic moieties can be of the linked type wherein at least two nuclei (either mono or polynuclear) are linked through bridging linkages to each other. Such bridging linkages can be selected from the group consisting of carbon-to-carbon single bonds, ether linkages, keto linkages, sulfide linkages, polysulfide linkages of 2 to 6 sulfur atoms, sulfinyl linkages, sulfonyl linkages, methylene linkages, alkylene linkages, di-(lower alkyl)-methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages.

In an embodiment, the diamine suitable in the present invention is diethylenetriamine.

In another embodiment, the diamine is those polyamines obtained from condensation reactions of ethylene and propylene amine, or mixtures thereof. Specifically, the diamine is preferably those polyamines having the structure:

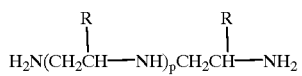

wherein R is chosen at each occurrence, from the group consisting of hydrogen, $C_1$–$C_4$ alkyl groups, or mixtures thereof; and p is an integer ranging from 0–8, preferably from 0–4, and most preferably 1–2.

The polyamine may also be of the formula:

wherein R and R" may be $C_1$–$C_4$ alkyl, preferably ethyl, propyl or isopropyl; R' may be hydrogen or $C_1$–$C_4$ alkyl, preferably hydrogen or methyl; and x is an integer of from about 1 to about 10.

The polyamine may also be a relatively low molecular weight poly(alkylene glycol) diamine of the formula:

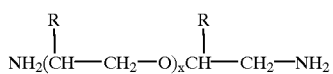

where x is from about 2 to 5, R is hydrogen or an alkyl of one to four carbon atoms and the polyethylene glycol diamine has $M_w$ of at least 100 with a mixture of ethylene oxide and propylene oxide. In a preferred embodiment of the invention, R is hydrogen. Also, x preferably averages from about 2 to about 3. When R is hydrogen and x is 2, the material is triethylene glycol diamine (JEFFAMINE® EDR-148 amine). When R is hydrogen and x is 3, the reactant is tetraethylene glycol diamine (JEFFAMINE® EDR-198 AMINE). It will be appreciated that throughout this description x is understood to be an average value of the distribution of polymers present, rather than an absolute number indicating a completely pure material.

The polyamine may be a polyoxyalkylene diamine. The polyoxyalkylene diamine reactants useful in this invention have the structure:

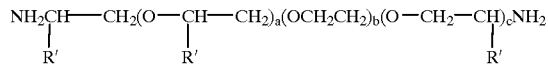

wherein the sum of a+c ranges from about 0 to about 8, b ranges from about 2 to about 50 and R' is an alkyl group of one to four carbon atoms. In an embodiment, the polyamine may be 4,7,10-trioxa-1,13-tridecane diamine. Again, a, b and c are to be understood as average values in many instances. In a preferred embodiment, the ethylene oxide moieties denoted by b represent at least 50% of the molecule. Stated in another way, this could be represented as:

$$\frac{b}{a+b+c} \geq 0.5$$

The JEFFAMINE ED series diamines fall within this definition:

| | a + c = | b= |
|---|---|---|
| JEFFAMINE ED-600 | 3.5 | 13.5 |
| JEFFAMINE ED-900 | 3.5 | 20.5 |
| JEFFAMINE ED-2001 | 3.5 | 45.5 |

These Jeffamines are available from Huntsman Chemical of Salt Lake City, Utah. As used herein, the term JEFFAMINE D-190 describes polyoxypropylene diamine having the structure:

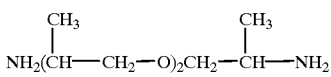

As used herein, the term JEFFAMINE D-230 describes polyoxypropylene diamine having the structure:

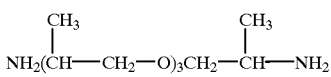

As used herein, the term JEFFAMINE D-400 describes Polyoxypropylene diamine having the structure:

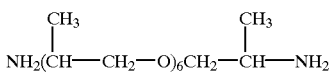

More than one polyoxyalkylene diamine within this definition may be used as desired to affect the properties of the final polyamide. Preferably, R' is methyl and the sum of a+c ranges from about 3 to 4. Alternatively, a and c are independently 1 or 2 and some, but not all, of the ethoxy moiety subscripted by b could be propoxy.

The epoxy resin compounds suitable for use in preparing the polymeric condensation products of this invention are organic compounds having at least two reactive epoxy groups. These compounds can contain substituent groups such as alkyl, aryl, organic ester, phosphate ester, halogen, cyano group among others without interfering with the condensation. The epoxy resin compounds may also have olefinic unsaturation on substituents. The preferred epoxy resin compounds are the aryl or alkyl substituted compounds having as the sole reactive group under the conditions of the reaction, at least two epoxy groups and wherein oxygen is present only in oxirane, ether and ester arrangement. Particularly preferred are the compounds consisting only of carbon, hydrogen and oxygen, wherein oxygen is present only in oxirane, ether and ester arrangement and the epoxy groups are terminal groups of an aryl substituted compound.

It is to be understood that the invention is not limited to the foregoing compounds alone and a variety of epoxy resin compounds can be used. Moreover, a mixture of two or more epoxy resins can be used for the practice of this invention. Or, if desired, the polyamine can be reacted successively with different epoxy resins to obtain the condensation polymers.

Examples of epoxy resins, among others, useful for the practice of this invention include: 2,2-bis(4-hydroxyphenyl) propane diglycidyl ether; 2,2'-[(1-methylethylidene)bis(4,1-phenyleneoxymethylene)]bisoxirane hompolymer; resorcinol diglycidyl ether; hydroquinone diglycidyl ether; triglycidyl tris(2-hydroxyethyl) isocyanurate; glycerol polyglycidyl ether; trimethylolpropane polyglycidyl ether; diglycerol polyglycidyl ether; polyglycerol polyglycidyl ether; sorbitol polyglycidyl ether and pentaerythritol polyglycidyl ether.

The epoxy resin having at least two epoxide groups may first be reacted with a polyamine having at least two amine groups selected from the group consisting of:

polyamines of the formula

wherein $R_2$ and $R_3$ may be the same or different and are selected from the group consisting of linear, cyclic or branched alkylene groups having from two to eight carbon atoms, aromatic groups, heteroaromatic groups and polycyclic groups; polyamines of the formula

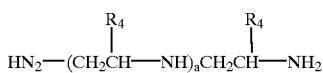

wherein $R_4$ is selected from the group consisting of hydrogen, $C_1$-$C_4$ alkyl groups and combinations thereof, and a is an integer ranging from 0–8; and polyamines of the formula

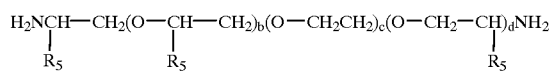

wherein the sum of b+d ranges from about 0 to 8, c ranges from about 2 to about 50 and $R_5$ is an alkyl group of one to four carbon atoms.

Many modifications may be made in the process of this invention without departing from the spirit and scope thereof which are defined only in the appended claims. For example, one skilled in the art may discover that particular reaction conditions, sequences, polyamines and dicarboxylic acids which may not be explicitly recited herein, but which are nevertheless anticipated, would give optimal or otherwise desirable results. In some instances, for example, it may be preferable to react the epoxy resin with a pre-formed polyamide or polyaminoamide simultaneously polymerize the polyacid, polyamine and epoxy resin.

Since the reaction product can contain mixtures both in terms of different acids and/or different amines, and also with different molecular weights, both with the same or different difunctional acids and/or polyamine, mixtures of condensation polymers can also be used pursuant to the present invention.

The reaction conditions and variants to obtain the condensation polymers are described below, and also have been described in the following references: U.S. Pat. No. 2,926,116; U.S. Pat No. 2,926,154; and U.S. Pat. No. 3,607,622. Each of these references is incorporated herein by reference.

It has been found particularly preferable to use in the reaction mixture wherein for said acid, ester or anhydride the ester, acid or anhydride functionality is in a molar ratio of approximately 1:1 with the amine functionality of the amine utilized.

The present invention provides methods for inhibiting the formation and deposition of silica and silicate compounds in water systems. The methods include adding to the water in a water system an effective amount of a polyamide made pursuant to the present invention. The precise effective dosages at which the polyamides of the invention can be employed will vary depending upon the makeup of the water being treated. An effective dosage will usually be in the range of about 0.5 to about 500 ppm, with the dosage in the range of about 1 to about 100 ppm being preferred. Most preferably, the polyamide is added to the water in an amount ranging from about 5 to about 60 ppm. These dosages are typical for water treatment additives.

The industrial waters that require treatment with the condensation polymers of the present invention are generally waters that contain silica in a dissolved, suspended or colloidal form. Such industrial waters are typified by those waters found in the Gulf of Mexico states, such as on the industrial gulf coast of Louisiana and Texas. The silica is present as dissolved silicates or their complex ions and may also be present as colloidal silica or suspended silica. The total silica concentration in these industrial waters is normally low when it exceeds about 5 ppm in total concentration; amorphous silica scale formation then becomes a problem. Obviously, the higher the concentration of total silica from all sources in these waters, the more difficult is the problem created by amorphous silica scale formation.

The industrial waters may be cooling waters, geothermal waters, salt water for desalinization purposes, industrial waters being prepared for boiler treatment and steam generation, downhole waters for petroleum crude recovery, pulp and paper mill waters, mining and mineral processing waters and the like. The problem of amorphous silica scale formation on the surfaces in contact with these industrial waters is particularly noted when the industrial waters are alkaline, having a pH of at least 5.0 or above, and contain at least 5 ppm total silica as $SiO_2$. The effective use of the condensation polymers of this invention are preferably at pH's of at least 5.0 and above and may be at temperatures ranging between ambient temperatures to temperatures in excess of 300° F. However, as one of skill in the art would appreciate, the condensation polymers of this invention should also be effective in waters having a pH lower than 5.0.

Of particular importance is the treatment of alkaline industrial waters being used as cooling waters, either on a once-through basis or particularly in a recirculating cooling water system wherein the make-up waters concentrate by up to a factor of 10 or so. When these alkaline cooling waters contain sufficient total silica, the problem of amorphous silica scale formation on surfaces in contact with these cooling waters is exaggerated. As the alkalinity increases, the problem of amorphous silica scale formation also increases. Therefore, the effectiveness of the condensation polymers used in this invention must also be demonstrated at pH's in excess of about 8.0.

Finally, the condensation polymers of the present invention may be combined with other standard water treating agents. For example, the condensation polymers may be used with other cooling water treatments, such as those used to inhibit corrosion and those treatments used to disperse or prohibit scale formation of other types. These type treatments may contain standard ingredients such as chromium, zinc, phosphate, orthophosphate, polyphosphate, low molecular weight polymeric dispersants such as homo or co-polymers of acrylic acid acrylamide, and various acrylates which are primarily used as threshold agents in these cooling water applications. These threshold agents combine with hardness precipitating species to inhibit crystal groups and better disperse these kinds of materials, thereby inhibiting scale formation of these hardness materials. However, these threshold polymeric agents do not have an effective use for silica control and are ineffective when used for amorphous silica scale control. Therefore, the condensation polymer of the present invention may be combined with these polymeric dispersants to effectively control scale formation of all kinds, including amorphous silica scale formation.

According to an embodiment of the invention, the condensation polymers of the invention are prepared as follows. A poly(aminoamide) condensation polymer may be prepared from about 0.5/1.0 to 1.0/0.5 molar ratio of polyamine/diacid (dicarboxylate). In another embodiment, the polyamine consists of a mixture of a polyamine and the reaction product of an epoxy resin and either the same or a different polyamine. Prior to use, the polymer may be first diluted to about 5 to 60% polymer in solution and/or acidified to a pH ranging from about 5.0–10.0 as is conventional in the art. The preferred polyamine and diacid (dicarboxylate) of the invention are diethylenetriamine and adipic acid (or its esters), respectively. Additional preferred polyamines and diacids are disclosed herein. Sulfuric acid is typically used to adjust the pH of the backbone solution, but the identity of the acid is not critical to the invention. Acetic acid, phosphoric acid, and hydrochloric acid can also be used. The use of hydrochloric acid would, however, be less desirable since it would introduce chloride ions into the product.

The only upper limitation on the molecular weight of the copolymers is that they are of any molecular weight which allows water-solubility.

The following examples are presented to describe preferred embodiments and utilities of the invention and are not meant to limit the invention unless otherwise stated in the claims appended hereto.

PREPARATION EXAMPLES

The polyamides of the present invention were made by condensation polymerization in the following manner.

Example 1

191.6 g of diethylenetriamine was weighed directly into the flask. That flask was equipped with resin head, stirrer, thermometer, thermocouple, distillation trap, and condenser, then stirred and cooled. Then, about half of the DI water (i.e., half of the 132.6 g) was added to the reactor, followed by adding 292 g adipic acid to the reactor while maintaining the reaction temperature at less than 90° C. Immediately after adding all of the adipic acid, external cooling was ceased. Heating to approximately 185° C. was begun. When the mixture reached about 123° C., water began to distill, and was removed continuously through the trap and collected in a graduated cylinder.

Heating was continued until the solution reached 185° C. Next, the solution was maintained at that temperature for three hours blanketed in $N_2$. At the end of 3 hours, the solution was air cooled to about 140–150° C., followed by careful addition of 417.2 g DI water. Next the solution was reheated to boiling and maintained at boiling for 60 minutes, then cooled to room temperature.

Condensation polymers 2–6 of Table 1 were prepared according to this technique, and have the physical characteristics as described below.

TABLE 1

| Polymer | Amine | Acids | Ratio Amine/Acid | $M_w$ | $M_n$ |
|---|---|---|---|---|---|
| 2 | A | C | 0.9/1.0 | 215000 | 7050 |
| 3 | A | C | 0.95/1.0 | 23600 | 6100 |
| 4 | A | D/C | 0.95/.33/.67 | 4400 | 2700 |
| 5 | A | E/C | 0.95/.33/.67 | 3000 | 2000 |
| 6 | A | D/C | 0.98/.33/.67 | 15200 | 5000 |

A = Diethylenetriamine, available from Aldrich Chemical Co. of Milwaukee, Wisconsin
C = $HO_2C(CH_2)_4CO_2H$ (adipic acid), available from Aldrich Chemical Co. of Milwaukee, Wisconsin
D = $HO_2C(CH_2)_8CH_2H$ (sebacic Acid), available from Aldrich Chemical Co. of Milwaukee, Wisconsin
E = Terephthalic acid, available from Aldrich Chemical Co. of Milwaukee, Wisconsin

Example 2

The following procedure was utilized to form a condensation terpolymer, wherein one of the polyamines to be condensed is first pre-reacted with a polyepoxide. In this instance, a terpolymer of adipic acid, diethylenetriamine and diethylenetriamine/EPON 828 reaction product was formed.

17.52 g of EPON 828, a Bisphenol A epoxy resin available from Shell Chemical of Houston, Texas, was mixed with 75.52 g of diethylenetriamine under a nitrogen blanket at 130° for two hours. After cooling to about 50°, 106.96 g of adipic acid and 100 g of DI water were added to the reactor. The mixture was heated to about 185° C. while distilling off water. After 3 hours at 185° C., the solution was cooled to about 150° C. and 180 g of DI water was added carefully. The solution was heated at boiling for I hour and cooled to room temperature. The BFV (Brookfield Viscosity) of the resulting product was 1700 cps (spindle 1, 1.5 rpm).

Example 3

The following procedure was utilized to form another condensation terpolymer, wherein one of the polyamines to be condensed is first pre-reacted with a polyepoxide. In this instance, a terpolymer of adipic acid, diethylenetriamine and diethylenetriamine/EPON 828 reaction product was formed.

3.8 g of EPON 828 and 78.5 g of diethylenetriamine were heated under a nitrogen blanket at 130° C. for 2 hours. After cooling to about 50° C., 117.7 g of adipic acid and 100 g of DI water were added. The mixture was heated to 185° C. while distilling off water. After 3 hours at 185° C., the solution was cooled to about 150° C., and 180 g of DI water was added carefully. The solution was heated at boiling for 1 hour and cooled to room temperature. The BFV of the resulting product was 648 cps (spindle 1, 1.5 rpm).

Example 4

Cross linked polyamides in accordance with the present invention were prepared in the following manner. 553.5 g of Poly(adipic acid/diethylenetriamine/Bisphenol A epoxy resin- diethylenetriamine adduct) (40.7%), prepared according to procedure of Example 3 was weighed directly into the flask. 1.33 g of polyepoxide, sorbitol polyglycidyl ether (available from Nagase America Corp. of New York, N.Y.) was also weighed directly into the reaction flask. Dosage was 0.6% based on polymer actives. The flask was equipped with resin head, stirrer, thermometer and thermocouple. The reaction mixture was heated to 60° C. with stirring for 1.0 hour then cooled to room temperature. The BFV of the resulting product was 5150 cps (spindle 3, 6 rpm), where the BFV of the starting polymer was only 1200 cps (spindle 3, 6 rpm). This increase indicates that cross-linking has occurred.

Example 5

An amine-rich polymer in accordance with the present invention was prepared in the following manner. 130.4 grams of diethylenetriamine were weighed directly into a flask. The flask was equipped with a stirrer, a thermocouple, a distillation trap and a condenser. DI water (50 grams) was added to the reactor, followed by the addition of 161.3 grams of adipic acid. The reaction mixture was heated to 185° C. with distillation of water starting at about 120° C. Heating continued until the solution temperature was maintained at 185° C. for 3 hours. A nitrogen blanket was applied throughout the heating cycle. After 3 hours, the solution was air cooled to 140–150° C., followed by the careful addition of 360 grams of DI water. The solution was reheated to 90° C. for one hour and then cooled to room temperature.

EXPERIMENTAL EXAMPLE

The purpose of this silica stabilization test was to determine the ability of a treatment chemical to inhibit the polymerization of silica from the soluble form to the colloidal form. In this test, the pH of a solution of soluble silicate ions was lowered from about pH 11 to about pH 7. In the pH range of 7–9, which is the dominant range for industrial processes like cooling water and desalination, the polymerization of silicate ions and subsequent particle growth into colloidal silica is thermodynamically preferred.

The test described below is for the example in which no treatment chemical was added:

1. Dissolve 0.236 g of $Na_2SiO_3 9H_2O$ in 100 mL of silica-free water in a plastic beaker. This gives a solution containing 500 ppm as $SiO_2$.
2. Stir and sparge gaseous $CO_2$ into the solution.
3. Remove the $CO_2$ sparger when the pH has dropped to 8.5. Because the $CO_2$ is still dissolving over time into the solution, the pH will continue to decrease without the sparger present (the lowest pH value obtained is usually 7.0).
4. Allow the samples to stand for 12–24 hours, then analyze the soluble $SiO_2$ (using the HACH Silicomolybdate method).

To test the performance of different treatment chemicals, the desired additive was dissolved into the sodium silicate solution just prior to step 2. Specifically, 0.4 mL of a 1.0% solution of the additive was added to the sodium silicate solution. This resulted in a 500 ppm $SiO_2$ solution containing 40 ppm actives of the desired treatment chemical.

The silica analytical test method used in the experiments is the High Range (0–100 ppm) Silicomolybdate Method from Hach Company. In this test method, a 2.5 mL sample of the test solution is diluted to 25 mL in a sample cell. The contents of Molybdate Reagent Powder Pillow are then added to the sample cell solution, followed by the contents of the Acid Reagent Powder Pillow. The solution is mixed well and allowed to stand for 10 minutes. At that time, the contents of the Citric Acid Powder Pillow is added to the sample cell with mixing, and the solution is allowed to stand for two minutes. At the end of this time, the absorbance of the sample cell solution was measured at 450 nm. An increase in soluble silica is based on the increase in absorption at450nm.

Tables 2–4 show silica stabilization test results from the study of various low molecular weight polymers (MW<100,000 g/mol). Specifically, the following polymeric samples were analyzed in this experiment: A=blank control (no treatment chemical); B=Acumer 5000, which is a poly (acrylic acid/2-acrylamido-2-methyl propane sulfonic acid), available from Rohm & Haas of North Olmstead, Ohio; C=poly(2-ethyl-oxazoline) ("PEOX"), available from BF Goodrich of Richfield, Ohio and D=poly(adipic acid/diethylenetriamine/EPON 828) ("PAM"), which is a polyamide made pursuant to the present invention. The PAM tested herein has the following structure: —(—C(=O) CH$_2$CH$_2$CH$_2$C(=O)—)$_x$(—NH—CH$_2$CH$_2$—NH—CH$_2$CH$_2$—NH—)$_y$(—CH$_2$CH(OH)—O—CH$_2$—P—C (CH$_3$)$_2$—P—O—CH(OH)CH$_2$—)$_z$
wherein P=aryl group, the mole ratio of x to y is about 0.93 to 1.00, and z is small (about 0.6 weight % of the total polymer mass).

TABLE 2

Silica Stabilization Test REsults - 18 Hour Test

| Sample | Chemical | Soluble SiO$_2$ (ppm as SiO$_2$) |
|---|---|---|
| A | Blank | 271 |
| B | Acumer 5000 | 254 |
| C | PEOX | 372 |
| D | PAM | 411 |

TABLE 3

Silica Stabilization Test Results - 22 Hour Test

| Sample | Chemical | Soluble SiO$_2$ (ppm as SiO$_2$) |
|---|---|---|
| A | Blank | 204 |
| B | Acumer 5000 | 227 |
| C | PEOX | 338 |
| D | PAM | 406 |

TABLE 4

Silica Stabilization Test Results - 4 Day Test

| Sample | Chemical | Soluble SiO$_2$ (ppm as SiO$_2$) |
|---|---|---|
| A | Blank | 169 |
| B | Acumer 5000 | — |
| C | PEOX | 159 |
| D | PAM | 206 |

Tables 2, 3, and 4 show results from 18 hour, 22 hour, and 4 day testing of silica-containing solutions in the presence of various additives. The results clearly show that both nonionic polymers, PEOX and PAM, give superior performance over that of the anionic dispersant polymer, namely Acumer 5000. In fact, the performance of Acumer 5000 was not statistically different than that observed for the blank solutions in which no scale control agent was added. This result is consistent with many years of observations from actual cooling water systems in which anionic dispersant polymers designed to control calcium phosphate and calcium carbonate scale and deposition do not demonstrate a benefit toward the control of silica scale. See Dubin et al, *Deposit control in high silica water*, Materials Performance. pp. 27–33 (1995); and *Gill, Silica Scale control*, CORROSION 98, Paper No. 226 (1998).

The performance of PAM over that of PEOX is also evident, showing that the structural modification of having the interactive functional groups within the polymer backbone results in improved silica polymerization inhibition activity.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for inhibiting the formation and deposition of silica and silicate compounds in water systems, the method comprising adding to the water in a water system an effective amount of a condensation polymer, the condensation polymer obtained by the polymerization of:

i) at least one carbonyl compound of formula

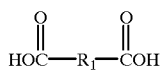

wherein R$_1$ is selected from the group consisting of linear, cyclic or branched alkylene groups having from four to eight carbon atoms, aromatic groups, polycyclic groups and heteroaromatic groups;

ii) at least one polyamine of formula

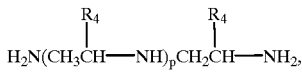

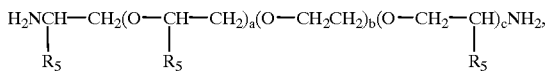

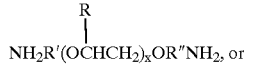

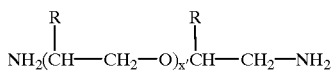

wherein
  R$_2$ and R$_3$ are independently selected from the group consisting of linear, cyclic or branched C$_2$–C$_8$ alkylene groups, aromatic groups, polycyclic groups and heteroaromatic groups;
  R$_4$ is independently selected at each occurrence from hydrogen and methyl;
  R$_5$ is independently selected at each occurrence from hydrogen and C$_{1-C4}$ alkyl;
  R' and R" are C$_1$–C$_4$ alkylene;
  R is hydrogen or C$_1$–C$_4$ alkyl;
  x is an integer of from 1 to about 10;
  x' is an integer of from about 2 to about 5;
  p is an integer of from 0 to about 8;
  the sum of a+c is from about 2 to about 8; and
  b is from about 2 to about 50; and iii) at least one epoxy resin selected from the group consisting of 2,2-bis(4-hydroxyphenyl) propane diglycidyl ether, 2,2'-[(1-methylethylidene)bis(4,1-phenyleneoxymethylene)]bisoxirane hompolymer, resorcinol diglycidyl ether, hydroquinone diglycidyl ether, triglycidyl tris(2-hydroxyethyl) isocyanurate, glycerol polyglycidyl ether, trimethylolpropane polyglycidyl ether, diglycerol polyglycidyl ether, polyglycerol polyglycidyl ether, sorbitol polyglycidyl ether and pentaerythritol polyglycidyl ether.

2. The method of claim 1 wherein the carbonyl compound is selected from the group consisting of: adipic acid; sebacic acid; terephthalic acid and combinations thereof.

3. The method of claim 1 wherein the polyamine compound is selected from the group consisting of: diethylenetriamine and 4,7,10-trioxa-1,13-tridecane diamine.

4. The method of claim 1 wherein the water system is selected from the group consisting of: cooling waters; geothermal waters; salt water for desalinization purposes; industrial waters being prepared for boiler treatment and steam generation; downhole waters for petroleum crude recovery; pulp and paper mill waters; and mining and mineral processing waters.

5. The method of claim 1 wherein the polymer is combined with an effective amount of a second water treating agent.

6. The method of claim 5 wherein the second water treating agent is selected from the group consisting of: polymer scale control dispersants; metal chelating agents; corrosion inhibitors; microbiocides; flocculants; coagulants; oxygen scavengers; neutralizing amines; and scale inhibitors.

* * * * *